US012613377B2

(12) United States Patent
Wu et al.

(10) Patent No.: US 12,613,377 B2
(45) Date of Patent: Apr. 28, 2026

(54) OPTICAL SPLITTING DEVICE AND OPTICAL SPLITTING SYSTEM

(71) Applicant: HUAWEI TECHNOLOGIES CO., LTD., Shenzhen (CN)

(72) Inventors: Dan Wu, Wuhan (CN); Wei Xiong, Shenzhen (CN); Qi Liu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 345 days.

(21) Appl. No.: 18/171,158

(22) Filed: Feb. 17, 2023

(65) Prior Publication Data

US 2023/0204860 A1      Jun. 29, 2023

Related U.S. Application Data

(63) Continuation of application No. PCT/CN2021/104919, filed on Jul. 7, 2021.

(30) Foreign Application Priority Data

Aug. 20, 2020    (CN) .......................... 202021750495.7

(51) Int. Cl.
     *G02B 6/28*          (2006.01)
     *G02B 6/44*          (2006.01)
     (Continued)

(52) U.S. Cl.
     CPC ......... *G02B 6/2804* (2013.01); *G02B 6/4446* (2013.01); *G02B 6/445* (2013.01); *H04B 10/25* (2013.01); *H04B 10/272* (2013.01)

(58) Field of Classification Search
     CPC .... G02B 6/2804; G02B 6/4446; G02B 6/445; H04B 10/25; H04B 10/272
     See application file for complete search history.

(56) References Cited

U.S. PATENT DOCUMENTS 8,737,837 B2 *  5/2014  Conner ................ G02B 6/4453
                                                              398/66
9,097,873 B2 *  8/2015  Conner ................ G02B 6/2804
                        (Continued)

FOREIGN PATENT DOCUMENTS

JP          5015083 B2      8/2012
WO      2014190281 A1    11/2014
                  (Continued)

OTHER PUBLICATIONS

"Series G: Transmission Systems and Media, Digital Systems and Networks, Digital sections and digital line system—Optical line systems for local and access networks, Gigabit-capable passive optical networks (GPON): Physical media dependent (PMD) layer specification," Recommendation ITU-T G.984.2, total 50 pages, Telecommunication Standardization Sector of ITU, International Union of Telecommunication, Geneva, Switzerland (Aug. 2019).

*Primary Examiner* — Ryan A Lepisto
(74) *Attorney, Agent, or Firm* — Leydig, Voit & Mayer, Ltd.

(57)                ABSTRACT

An optical splitting device is provided, which includes a housing, at least one first optical splitter which is disposed in the housing, a multi-core input optical interface, a multi-core output optical interface, and at least one single-core output optical interface. The multi-core input optical interface, the multi-core output optical interface, and the at least one single-core output optical interface are disposed on an outer wall of the housing, and each first optical splitter includes an input end, a first output end, and at least one second output end. The multi-core input optical interface is connected to an input end of the at least one first optical splitter, the first output end of each first optical splitter is connected to the multi-core output optical interface, and the second output end of each first optical splitter is connected (Continued)

to the single-core output optical interface in a one-to-one correspondence.

9 Claims, 6 Drawing Sheets

(51) Int. Cl.
  H04B 10/25 (2013.01)
  H04B 10/272 (2013.01)

(56) References Cited

U.S. PATENT DOCUMENTS

| | | | | |
|---|---|---|---|---|
| 9,482,840 | B2 * | 11/2016 | Conner | ................ G02B 6/4475 |
| 9,557,498 | B2 * | 1/2017 | Loeffelholz | .......... G02B 6/3895 |
| 9,989,705 | B2 * | 6/2018 | Jensen | .............. G02B 6/44715 |
| 10,151,897 | B2 * | 12/2018 | Gronvall | ............. G02B 6/4452 |
| 2011/0158598 | A1 | 6/2011 | Leblanc et al. | |
| 2011/0236021 | A1 * | 9/2011 | Presi | ................... H04J 14/0247 |
| | | | | 398/67 |
| 2011/0293277 | A1 * | 12/2011 | Bradea | ................... G02B 6/445 |
| | | | | 398/66 |
| 2014/0254986 | A1 | 9/2014 | Kmit et al. | |
| 2018/0123693 | A1 * | 5/2018 | Yang | ................. G02B 6/02042 |
| 2020/0209479 | A1 | 7/2020 | Zhang et al. | |

FOREIGN PATENT DOCUMENTS

| | | | |
|---|---|---|---|
| WO | 2017090622 | A1 | 6/2017 |
| WO | 2020133342 | A1 | 7/2020 |

* cited by examiner

OPTICAL SPLITTING DEVICE AND OPTICAL SPLITTING SYSTEM

CROSS-REFERENCE TO RELATED APPLICATIONS

This application is a continuation of International Application No. PCT/CN2021/104919, filed on Jul. 7, 2021, which claims priority to Chinese Patent Application No. 202021750495.7, filed on Aug. 20, 2020. The disclosures of the aforementioned applications are hereby incorporated by reference in their entireties.

TECHNICAL FIELD

Embodiments of the application relate to the field of optical communication, and in particular, to an optical splitting device and an optical splitting system.

BACKGROUND

With development of modern society and explosive growth of information, people's demand for a network throughput capability continuously increases. Optical transmission gradually becomes a mainstream modern communications solution by virtue of unique characteristics such as ultra-high bandwidth and low electromagnetic interference. In particular, a network newly constructed at a current stage such as an access network represented by fiber to the home (FTTH) is being deployed on a large scale.

In fiber to the home network construction, from an optical line terminal (OLT) to an optical network terminal (ONT), an intermediate optical distribution network (ODN) is required for interconnection. The ODN includes a feeder cable, a distribution cable, and a drop cable. In a current ODN solution, a fiber access terminal (FAT) configured to connect a distribution cable and a drop cable supports only a single-core distribution cable, and each FAT supports a limited quantity of drop cables. In a scenario with relatively high user density, a quantity of distribution cables and a quantity of FATs need to be increased. Therefore, investment costs and construction difficulty are increased.

SUMMARY

Embodiments of this application provide an optical splitting device and an optical splitting system, so that the optical splitting device can be connected to more ONTs, and investment costs and construction difficulty are reduced in a scenario with relatively high user density.

According to a first aspect, an embodiment of this application provides an optical splitting device, including a housing, at least one first optical splitter, a multi-core input optical interface, a multi-core output optical interface, and at least one single-core output optical interface. The multi-core input optical interface, the multi-core output optical interface, and the at least one single-core output optical interface are disposed on an outer wall of the housing. The at least one first optical splitter is disposed in the housing. Each first optical splitter includes an input end, a first output end, and at least one second output end. The multi-core input optical interface is connected to the input end of the at least one first optical splitter, the first output end of each first optical splitter is connected to the multi-core output optical interface, and the second output end of each first optical splitter is connected to the single-core output optical interface in a one-to-one correspondence.

In this implementation, the multi-core input optical interface of the optical splitting device supports a plurality of optical fibers, a plurality of optical splitters may be disposed in the optical splitting device, and each optical fiber may be connected to an input end of a corresponding optical splitter. Although a quantity of output ends of each optical splitter is limited, because a quantity of optical splitters in the optical splitting device is increased, the optical splitting device can be connected to more ONTs. Therefore, in a scenario with relatively high user density, investment costs and construction difficulty are reduced.

In a possible implementation, a first multi-core adapter is disposed on the multi-core input optical interface, a second multi-core adapter is disposed on the multi-core output optical interface, and a single-core adapter is disposed on each single-core output optical interface. By presetting the fiber adapters, plug-and-play with fiber connectors can be implemented during on-site construction. Therefore, splicing operations are spared, and construction efficiency can be improved.

In a possible implementation, an in-housing port of the first multi-core adapter is connected to one end of at least one first single-core fiber connector, and the other end of the at least one first single-core fiber connector is connected to the input end of the at least one first optical splitter in a one-to-one correspondence by using an optical fiber; an in-housing port of the second multi-core adapter is connected to one end of at least one second single-core fiber connector, and the other end of the at least one second single-core fiber connector is connected to the first output end of the at least one first optical splitter in a one-to-one correspondence by using an optical fiber; and an in-housing port of each single-core adapter is connected to one end of each third single-core fiber connector in a one-to-one correspondence, and the other end of each third single-core fiber connector is connected to each second output end of the first optical splitter by using an optical fiber. In this implementation, a specific connection mode in the optical splitting device is provided. Therefore, feasibility of this solution is improved.

In a possible implementation, a quantity of fiber cores supported by the first multi-core adapter and a quantity of fiber cores supported by the second multi-core adapter are greater than or equal to a quantity of the first optical splitters. In an actual application, at an initial stage of fiber deployment, there may not be sufficient users who require fiber access. In this case, only some optical splitters may be preset in a second optical splitting device, and when demand for access becomes larger later, all optical splitters that can be supported are connected, to complete later capacity expansion. The foregoing design can satisfy the demand of more customers, and save investments of the customers at the initial stage. In addition, no optical splitting device needs to be added in later capacity expansion, and only an optical splitter needs to be added to the original optical splitting device. Therefore, construction difficulty and material costs are reduced.

In a possible implementation, an out-of-housing port of the first multi-core adapter is configured to connect to a first multi-core fiber connector, an out-of-housing port of the second multi-core adapter is configured to connect to a second multi-core fiber connector, and an out-of-housing port of each single-core adapter is configured to connect to a fourth single-core fiber connector. In this implementation, a connection mode between the optical splitting device and an external fiber connector is provided. Therefore, feasibility of this solution is further improved.

In a possible implementation, an optical cable connected to the first multi-core fiber connector and an optical cable connected to the second multi-core fiber connector are distribution cables, and an optical cable connected to the fourth single-core fiber connector is a drop cable. The optical splitting device in this application is mainly applied to a distribution cable, and practical value of this solution is reflected.

In a possible implementation, at least one second optical splitter is further disposed in the housing, the second output end of the at least one first optical splitter is connected to an input end of the at least one second optical splitter in a one-to-one correspondence, and an output end of the at least one second optical splitter is connected to the single-core output optical interface in a one-to-one correspondence. In this implementation, the output end of the first optical splitter may be further connected to the second optical splitter. Therefore, scalability of this solution is improved.

In a possible implementation, the first optical splitter is an uneven optical splitter, and output optical power of the first output end is higher than output optical power of the second output end. It may be understood that because the multi-core output optical interface connected to the first output end is configured to connect to a multi-core input optical interface of an optical splitting device at a next level, allocating relatively high optical power to the first output end may enable optical signals of most power to be retained on a backbone path and transmitted over a longer distance, so that the optical signals are distributed to users for use over a longer distance.

In a possible implementation, the housing includes a base and an upper cover, the base and the upper cover are detachably and fixedly connected, the multi-core input optical interface, the multi-core output optical interface, and the at least one single-core output optical interface are disposed on an end face of the base. In this implementation, a specific housing structure is provided, so that this solution is more practical.

According to a second aspect, this application provides an optical splitting device, including a housing, a multi-core input optical interface, and a plurality of multi-core output optical interfaces, where the multi-core input optical interface and the plurality of multi-core output optical interfaces are disposed on an outer wall of the housing, and the multi-core input optical interface is connected to the plurality of multi-core output optical interfaces.

In a possible implementation, a first multi-core adapter is disposed on the multi-core input optical interface, and a second multi-core adapter is disposed on each multi-core output optical interface. By presetting the fiber adapters, plug-and-play with fiber connectors can be implemented during on-site construction. Therefore, splicing operations are spared, and construction efficiency can be improved.

In a possible implementation, an in-housing port of the first multi-core adapter is connected to one end of a first multi-core fiber connector, an in-housing port of each second multi-core adapter is connected to one end of a plurality of single-core fiber connectors, and the other end of the first multi-core fiber connector is connected to the other end of the plurality of single-core fiber connectors by using a fiber patch cord. In this implementation, a specific connection mode in the optical splitting device is provided. Therefore, feasibility of this solution is improved.

In a possible implementation, an out-of-housing port of the first multi-core adapter is configured to connect to a second multi-core fiber connector, and out-of-housing ports of the plurality of second multi-core adapters are configured to connect to a plurality of third multi-core fiber connectors in a one-to-one correspondence. In this implementation, a connection mode between the optical splitting device and an external fiber connector is provided. Therefore, feasibility of this solution is further improved.

In a possible implementation, a plurality of optical splitters are further disposed in the housing, the optical splitters are in a one-to-one correspondence with the multi-core output optical interfaces, an input end of each optical splitter is connected to the multi-core input optical interface, and a plurality of output ends of each optical splitter are connected to a multi-core output optical interface corresponding to the optical splitter. Disposition of the optical splitters can save PON resources while ensuring high-density user access.

In a possible implementation, the housing includes a base and an upper cover, the base and the upper cover are detachably and fixedly connected, and the multi-core input optical interface and the plurality of multi-core output optical interfaces are disposed on an end face of the base. In this implementation, a specific housing structure is provided, so that this solution is more practical.

According to a third aspect, this application provides an optical splitting system, including an OLT, a plurality of ONTs, a first optical splitting device, and a plurality of groups of cascaded second optical splitting devices, where the first optical splitting device is the optical splitting device according to any implementation of the second aspect, and the second optical splitting device is the optical splitting device according to any implementation of the first aspect.

The OLT is connected to a multi-core input optical interface of the first optical splitting device. Each multi-core output optical interface of the first optical splitting device is connected to a multi-core input optical interface of a second optical splitting device at a first level in a group of cascaded second optical splitting devices. A multi-core output optical interface of a second optical splitting device at an upper level in every two adjacent cascaded second optical splitting devices is connected to a multi-core input optical interface of a second optical splitting device at a lower level. A single-core output optical interface of each second optical splitting device is connected to the ONT in a one-to-one correspondence.

In the embodiments of this application, the multi-core input optical interface of the optical splitting device supports a plurality of optical fibers, a plurality of optical splitters may be disposed in the optical splitting device, and each optical fiber may be connected to an input end of a corresponding optical splitter. Although a quantity of output ends of each optical splitter is limited, because a quantity of optical splitters in the optical splitting device is increased, the optical splitting device can be connected to more ONTs. Therefore, in a scenario with relatively high user density, investment costs and construction difficulty are reduced.

DESCRIPTION OF EMBODIMENTS

Embodiments of this application provide an optical splitting device and an optical splitting system, so that the optical splitting device can be connected to more ONTs, and investment costs and construction difficulty are reduced in a scenario with relatively high user density.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
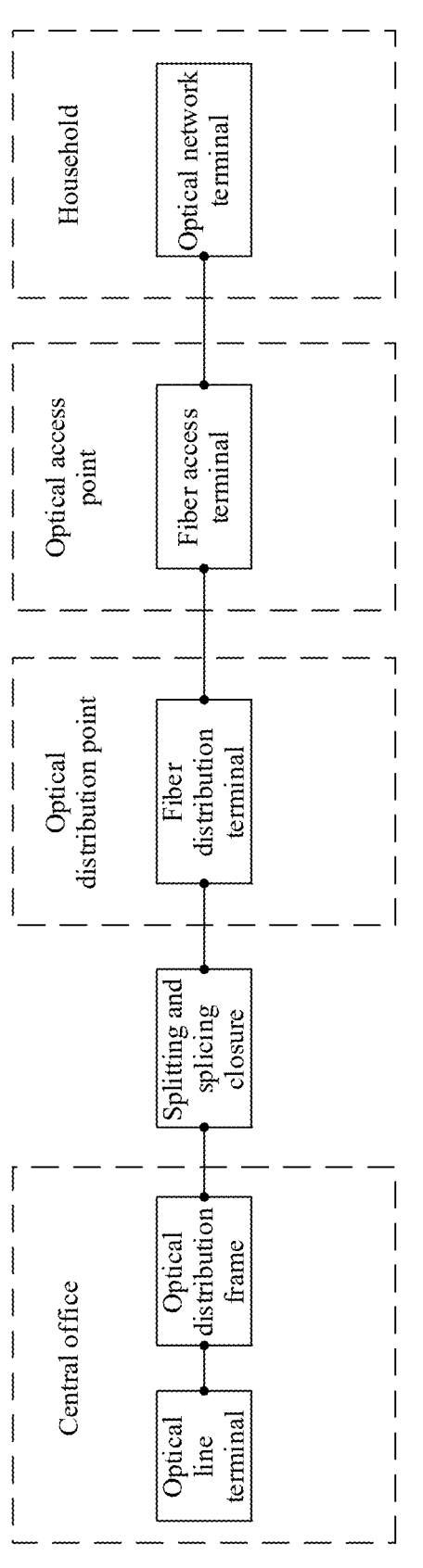
FIG. 1 is an architectural diagram of a network to which this application is applied.

FIG. 1 is an architectural diagram of a network to which this application is applied. This application is mainly applied to an FTTx passive optical network (PON). The FTTx may be FTTH (fiber to the home), or may be FTTC (fiber to the curb), or may be FTTP (fiber to the premises), or may be FTTN (fiber to the node or neighborhood), or may be FTTO (fiber to the office) or FTTSA (fiber to the service area). Using an FTTH network as an example, in a central office (CO), a fiber patch cord output from an optical line terminal (OLT) is connected to an optical distribution frame (ODF). An optical cable distributed by using the ODF is connected to a fiber distribution terminal (FDT) located at an optical distribution point. If the ODF is far away from the FDT, a splitting and splicing closure (SSC) may be mounted between the ODF and the FDT for connection. In secondary distribution through the FDT, an optical cable is connected to a fiber access terminal (FAT) located at an optical access point. If the FDT is far away from the FAT, an SSC may also be mounted for connection. The FAT is configured to connect an optical cable to an optical network terminal (ONT) in a household. The optical cable between the OLT and the optical distribution point is referred to as a feeder cable. The optical cable between the optical distribution point and the optical access point is referred to as a distribution cable. The optical cable between the optical access point and the ONT is referred to as a drop cable. Specifically, the optical splitting device provided in this application may be the FAT applied to the optical access point.

Figure 2:
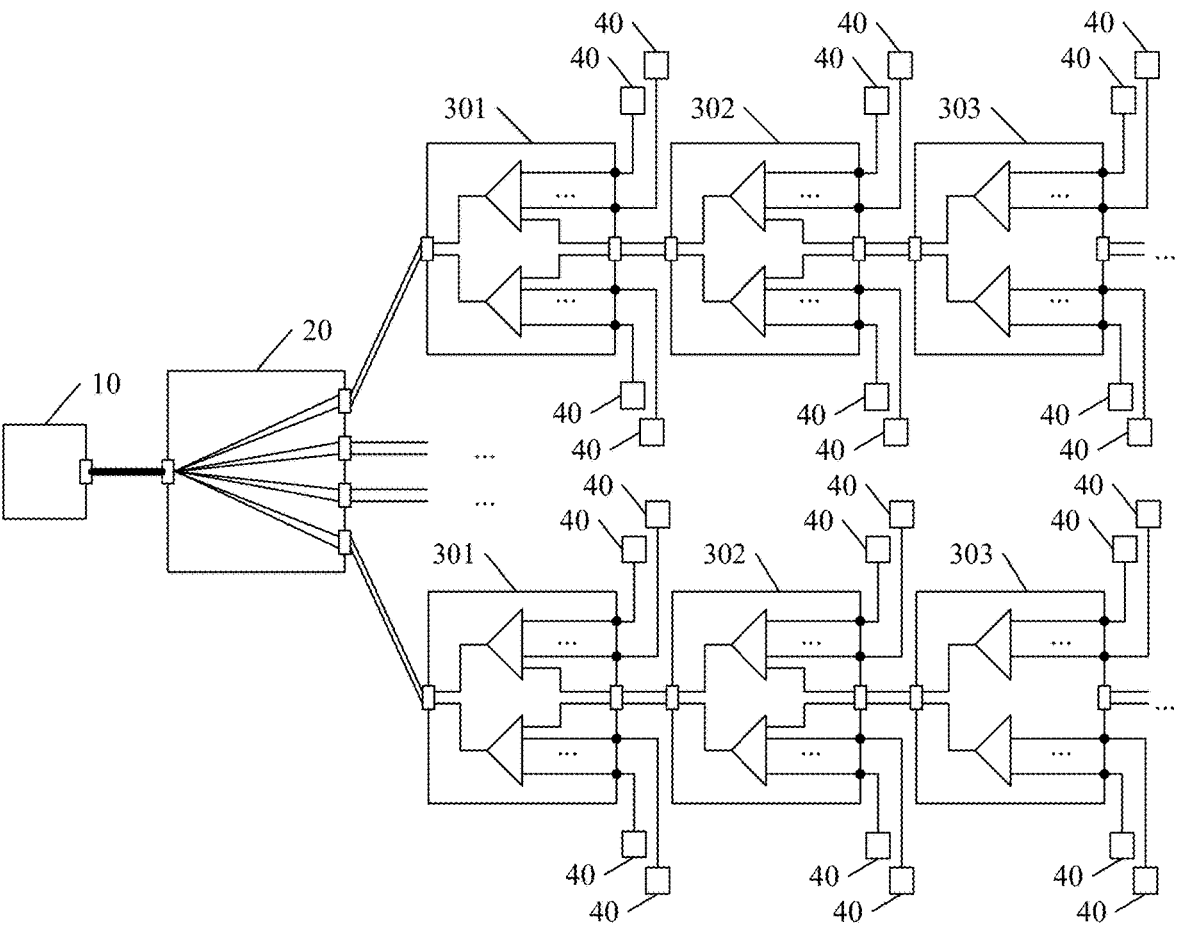
FIG. 2 is a schematic diagram of an embodiment of an optical splitting system according to this application.

The following first describes an optical splitting system provided in this application. FIG. 2 is a schematic diagram of an embodiment of an optical splitting system according to this application. The optical splitting system includes an optical line terminal 10, a first optical splitting device 20, a plurality of groups of cascaded second optical splitting devices (as shown in FIG. 2, each group of cascaded second optical splitting devices includes optical splitting devices 301 to 303), and a plurality of optical network terminals 40. The optical line terminal 10 is connected to a multi-core input optical interface of the first optical splitting device 20. The first optical splitting device 20 has a plurality of multi-core output optical interfaces, and each multi-core output optical interface corresponds to a group of cascaded second optical splitting devices (as shown in FIG. 2, corresponding to four groups of cascaded second optical splitting devices). Specifically, each multi-core output optical interface of the first optical splitting device 20 is connected to a multi-core input optical interface of an optical splitting device 301 at a first level in a group of cascaded second optical splitting devices. A multi-core output optical interface of a second optical splitting device at an upper level in every two adjacent second optical splitting devices is connected to a multi-core input optical interface of a second optical splitting device at a lower level. As shown in FIG. 2, a multi-core output optical interface of the optical splitting device 301 at the first level is connected to a multi-core input optical interface of an optical splitting device 302 at a second level, a multi-core output optical interface of the optical splitting device 302 at the second level is connected to a multi-core input optical interface of an optical splitting device at a third level, and so on. At least one optical splitter is disposed in each second optical splitting device, and an input end of each optical splitter is connected to a multi-core input optical interface of the second optical splitting device by using an optical fiber. The optical splitter further includes a plurality of output ends, where one output end is connected to a multi-core output optical interface of the second optical splitting device, and the other output ends are connected to a plurality of single-core output optical interfaces of the second optical splitting device in a one-to-one correspondence. A plurality of single-core output optical interfaces of each second optical splitting device are connected to a plurality of optical network terminals 40 in a one-to-one correspondence.

It may be understood that in the optical splitting system provided in this application, a device such as an ODF, an FDT, and an SSC may be further disposed between the optical line terminal 10 and the first optical splitting device 20. For details, refer to the description of FIG. 1. Details are not described again herein.

It should be noted that cascaded second optical splitting devices are two or more second optical splitting devices sequentially connected. It may be understood that a specific quantity of cascaded second optical splitting devices is not limited in this application. In addition, the first optical splitting device 20 and the second optical splitting device are connected by using a multi-core optical fiber, and every two adjacent second optical splitting devices are also connected by using a multi-core optical fiber. A quantity of fiber cores of the multi-core optical fiber may be two, as shown in FIG. 2. Alternatively, the optical fiber may be a multi-core optical fiber with more than two fiber cores. This is not specifically limited in this application.

Figure 3:
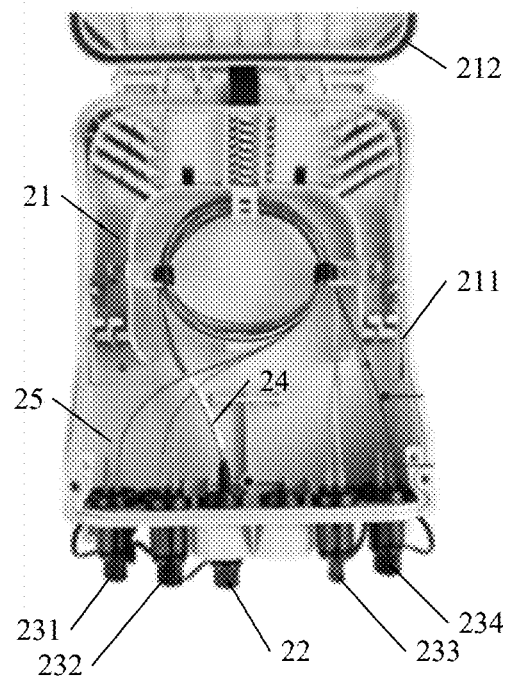
FIG. 3 is a schematic structural diagram of a first optical splitting device according to this application.

The following describes in detail the first optical splitting device shown in FIG. 2. FIG. 3 is a schematic structural diagram of a first optical splitting device according to this application. The first optical splitting device includes a housing 21, a multi-core input optical interface 22, and a plurality of multi-core output optical interfaces (231, 232, 233, and 234 shown in FIG. 3). The multi-core input optical interface 22 and the plurality of multi-core output optical interfaces are disposed on an outer wall of the housing 21. The multi-core input optical interface 22 is connected to the plurality of multi-core output optical interfaces. Specifically, the housing 21 includes a base 211 and an upper cover 212. The base 211 and the upper cover 212 are detachably and fixedly connected. The multi-core input optical interface 22 and the plurality of multi-core output optical interfaces are disposed on an end face of the base 211. It should be understood that the multi-core input optical interface and the multi-core output optical interface may allow a plurality of optical fibers to pass.

In a possible implementation, a first multi-core adapter is disposed on the multi-core input optical interface 22, and a second multi-core adapter may be disposed on each multi-core output optical interface. Both the first multi-core adapter and the second multi-core adapter may be fiber adapters configured to connect to fiber connectors. By presetting the multi-core adapters on the multi-core input optical interface and the multi-core output optical interface, plug-and-play with fiber connectors can be implemented during on-site construction. Therefore, splicing operations are spared, and construction efficiency can be improved.

Specifically, the first multi-core adapter is embedded on the multi-core input optical interface 22, and each second multi-core adapter is embedded on a corresponding multi-core output optical interface. A port of the first multi-core adapter, located in the housing 21, is connected to one end of a first multi-core fiber connector 24. A port of the second multi-core adapter, located in the housing 21, is connected to one end of a plurality of single-core fiber connectors 25. For example, two single-core fiber connectors 25 are connected to each second multi-core adapter shown in FIG. 3. The other end of the first multi-core fiber connector 24 is connected to the other end of the plurality of single-core fiber connectors 25 by using a fiber patch cord. For example, the other end of the first multi-core fiber connector 24 shown in FIG. 3 is split into eight optical fibers by using a fiber patch cord, and each of the eight optical fibers is connected to a corresponding single-core fiber connector 25.

It should be noted that the first multi-core fiber connector 24 may be an MPO connector and that the single-core fiber connector 25 may be an LC connector.

It may be understood that a port of the first multi-core adapter, located out of the housing 21, is configured to connect to one end of a second multi-core fiber connector, and that the other end of the second multi-core fiber connector may be connected to an OLT by using a multi-core optical fiber. A port of the second multi-core adapter, located out of the housing 21, is configured to connect to one end of a third multi-core fiber connector, and the other end of the third multi-core fiber connector may be connected to a multi-core input optical interface of a second optical splitting device by using a multi-core optical fiber. It should be understood that dustproof caps may be disposed on out-of-housing ports of the first multi-core adapter and the second multi-core adapter. When a fiber connector does not need to be mounted, a fiber adapter may be sealed by mounting a dustproof cap.

It should be noted that a quantity of multi-core output optical interfaces on the first optical splitting device and a quantity of fiber cores supported by each multi-core output optical interface are not limited in this application. In addition, a quantity of fiber cores supported by the multi-core input optical interface on the first optical splitting device is not limited in this application either.

Figure 4:
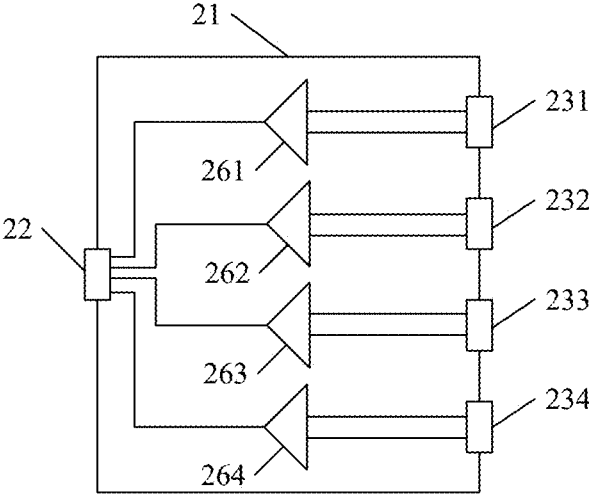
FIG. 4 is a schematic diagram of an embodiment of a first optical splitting device according to this application.

Optionally. FIG. 4 is a schematic diagram of an embodiment of the first optical splitting device according to this application. A plurality of optical splitters (optical splitters 261 to 264 shown in FIG. 4) are further disposed in the housing 21. The plurality of optical splitters are in a one-to-one correspondence with the plurality of multi-core output optical interfaces. An input end of each optical splitter is connected to the multi-core adapter on the multi-core input optical interface 22. A plurality of output ends of each optical splitter are connected to a multi-core adapter on a corresponding multi-core output optical interface. For example, optical splitters shown in FIG. 4 are even optical splitters whose split ratios are 1:2, and each optical splitter has one input end and two output ends. It should be understood that the optical splitters disposed in the first optical splitting device may alternatively be uneven optical splitters and that the split ratios of the optical splitters are not limited in this application. In this embodiment, disposition of the optical splitters in the first optical splitting device can save PON resources while ensuring high-density user access.

Figure 5:
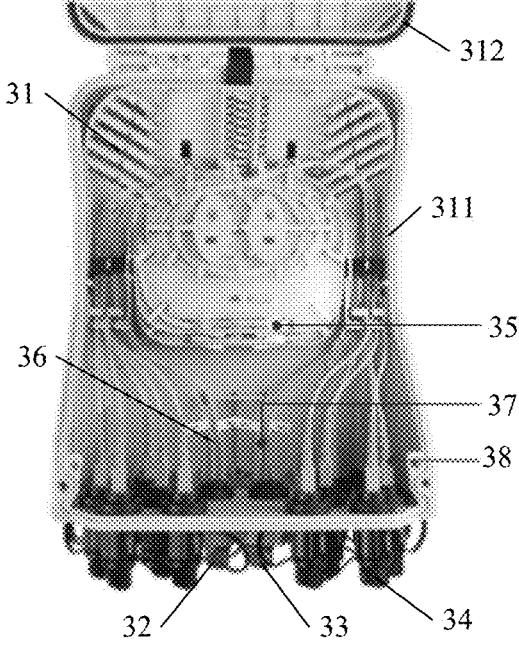
FIG. 5 is a schematic structural diagram of a second optical splitting device according to this application.

The following describes in detail the second optical splitting device shown in FIG. 2. FIG. 5 is a schematic structural diagram of a second optical splitting device according to this application. The second optical splitting device includes a housing 31, a multi-core input optical interface 32, a multi-core output optical interface 33, at least one single-core output optical interface 34, and at least one first optical splitter 35. The multi-core input optical interface 32, the multi-core output optical interface 33, and the single-core output optical interface 34 are disposed on an outer wall of the housing 31. The first optical splitter 35 is disposed in the housing 31. Each first optical splitter 35 includes an input end, a first output end, and at least one second output end. The multi-core input optical interface 32 is connected to the input end of each first optical splitter 35, the first output end of each first optical splitter 35 is connected to the multi-core output optical interface 33, and the at least one second output end of each first optical splitter is connected to the at least one single-core output optical interface 34 in a one-to-one correspondence. Specifically, the housing 31 includes a base 311 and an upper cover 312. The base 311 and the upper cover 312 are detachably and fixedly connected. The multi-core input optical interface 32, the multi-core output optical interface 33, and the single-core output optical interface are disposed on an end face of the base 311. It should be understood that the multi-core input optical interface and the multi-core output optical interface allow a plurality of optical fibers to pass, and the single-core output optical interface allows a single optical fiber to pass.

It may be understood that a quantity of fiber cores supported by the multi-core input optical interface 32 and a quantity of fiber cores supported by the multi-core output optical interface 33 are greater than or equal to a quantity of the first optical splitters 35.

Figure 6:
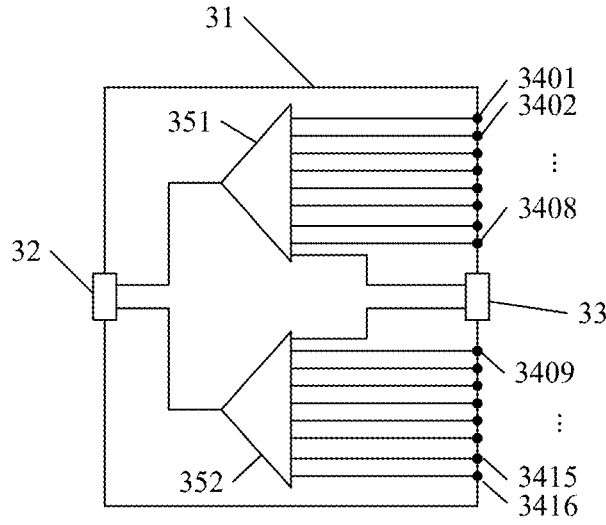
FIG. 6 is a schematic diagram of an embodiment of a second optical splitting device according to this application.

The following further describes the second optical splitting device by using FIG. 6 as an example. FIG. 6 is a schematic diagram of an embodiment of the second optical splitting device according to this application. As shown in FIG. 6, both the multi-core input optical interface 32 and the multi-core output optical interface 33 support two optical fibers, and the two optical fibers are respectively connected to an input end of an optical splitter 351 and an input end of an optical splitter 352. Split ratios of the optical splitter 351 and the optical splitter 352 are 1:9. A first output end of the optical splitter 351 is connected to the multi-core output optical interface 33 by using an optical fiber. Eight second output ends of the optical splitter 351 are connected to eight single-core output optical interfaces (3401 to 3408) in a one-to-one correspondence by using optical fibers. A first output end of the optical splitter 352 is connected to the multi-core output optical interface 33 by using an optical fiber. Eight second output ends of the optical splitter 352 are connected to eight single-core output optical interfaces (3409 to 3416) in a one-to-one correspondence by using optical fibers. It should be understood that the 16 single-core output optical interfaces are connected to ONTs in a one-to-one correspondence by using optical fibers.

In a possible implementation, the optical splitter in the second optical splitting device is an uneven optical splitter, and output optical power of the first output end is higher than output optical power of the second output end. For example, the output optical power of the first output end accounts for 70% of total output power, and the output optical power of the second output end accounts for 30% of the total output power. It may be understood that because the multi-core output optical interface 33 connected to the first output end is configured to connect to a multi-core input optical interface of a second optical splitting device at a next level, allocating relatively high optical power to the first output end may enable optical signals of most power to be retained on a backbone path and transmitted over a longer distance, so that the optical signals are distributed to users for use over a longer distance.

Optionally, output optical power of each second output end may be the same, or may be different. A ratio of the optical power of the first output end to the optical power of the second output end may be 70/30, or may be another ratio such as 80/20 or 90/10. The optical splitter in the second optical splitting device may alternatively be an even optical splitter. This is not specifically limited herein.

Figure 7:
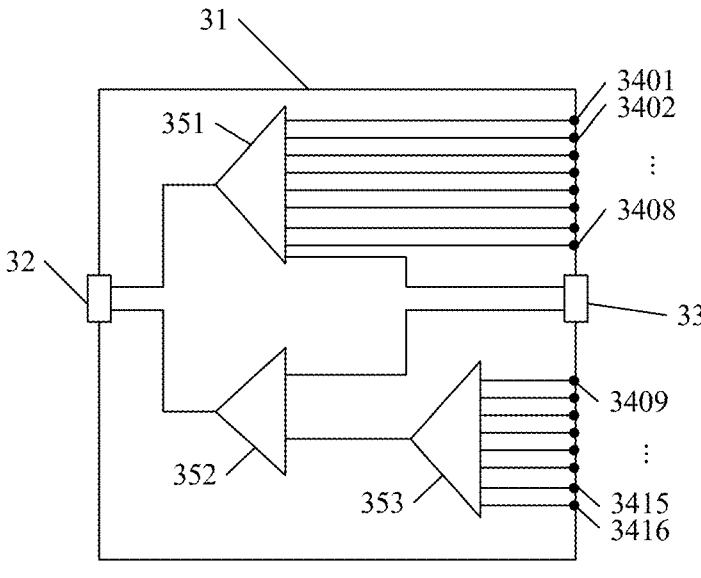
FIG. 7 is a schematic diagram of another embodiment of a second optical splitting device according to this application.

FIG. 7 is a schematic diagram of another embodiment of the second optical splitting device according to this application. In this implementation, a second optical splitter is further disposed in the housing 31. An input end of the second optical splitter is connected to the second output end of the first optical splitter, and an output end of the second optical splitter is connected to the single-core output optical interface in a one-to-one correspondence. As shown in FIG. 7, the optical splitter 351 is similar to the optical splitter 351 shown in FIG. 6, and is an uneven optical splitter whose split ratio is 1:9. The optical splitter 352 is different from the optical splitter 352 shown in FIG. 6, and is an uneven optical splitter whose split ratio is 1:2. The first output end of the optical splitter 352 is also connected to the multi-core output optical interface 33 by using an optical fiber. The second output end of the optical splitter 352 is connected to an input end of an optical splitter 353 by using an optical fiber. The optical splitter 353 is an even optical splitter whose split ratio is 1:8. Eight output ends of the optical splitter 353 are connected to eight single-core input optical interfaces (3409 to 3416) in a one-to-one correspondence by using optical fibers. It may be understood that a combination of the optical splitter 352 and the optical splitter 353 can also achieve an effect of the optical splitter 351.

Figure 8:
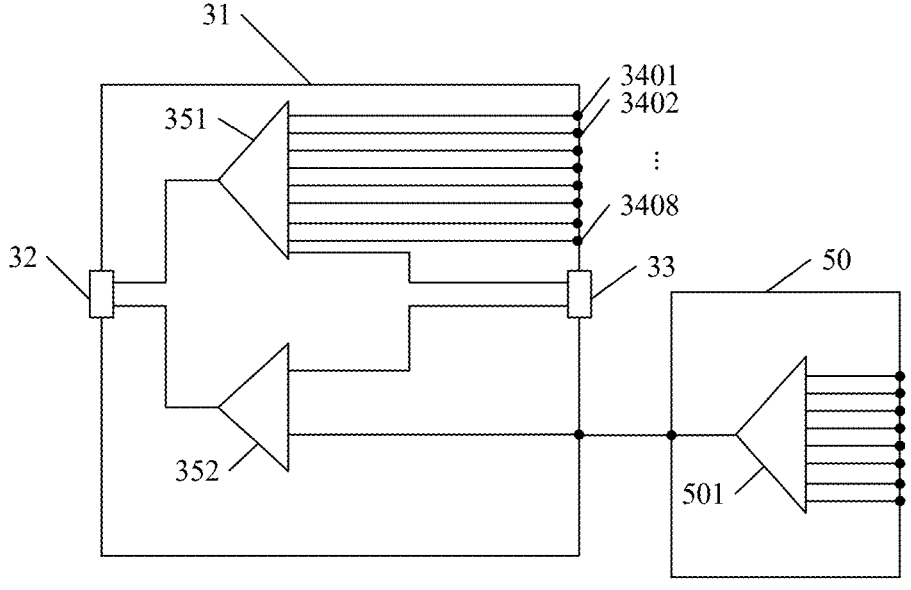
FIG. 8 is a schematic diagram of another embodiment of a second optical splitting device according to this application.

In an actual application, at an initial stage of fiber deployment, there may not be sufficient users who require fiber access. In this case, only the optical splitter 351 and the optical splitter 352 may be preset in the second optical splitting device, and when demand for access becomes larger later, the optical splitter 353 may be connected, to complete later capacity expansion. In addition, in another implementation, as shown in FIG. 8, only the optical splitter 351 and the optical splitter 352 are preset in the second optical splitting device, and a third optical splitting device 50 is mounted when the demand for access becomes larger later. Specifically, the second output end of the optical splitter 352 is connected to an input end of an optical splitter 501 in the third optical splitter 50. It should be understood that the optical splitter 501 in FIG. 8 is similar to the optical splitter 353 in FIG. 7. Details are not described again herein. The foregoing design can satisfy the demand of more customers, and save investments of the customers at the initial stage. In addition, no optical splitting device needs to be added in later capacity expansion, and only an optical splitter needs to be added to the original optical splitting device. Therefore, construction difficulty and material costs are reduced.

Specifically, the connection between the first optical splitter and the second optical splitter may be implemented by using a fiber connector carrying an optical fiber, or may be implemented by using optical fiber splicing. This is not specifically limited herein.

In a possible implementation, as shown in FIG. 5, a first multi-core adapter may be disposed on the multi-core input optical interface 32, a second multi-core adapter may be disposed on the multi-core output optical interface 33, and a single-core adapter may be disposed on each single-core output optical interface. All of the first multi-core adapter, the second multi-core adapter, and the single-core adapter may be fiber adapters configured to connect to fiber connectors. By presetting the fiber adapters, plug-and-play with fiber connectors can be implemented during on-site construction. Therefore, splicing operations are spared, and construction efficiency can be improved.

Specifically, the first multi-core adapter is embedded on the multi-core input optical interface 32, the second multi-core adapter is embedded on the multi-core output optical interface 33, and each single-core adapter is mounted on the corresponding single-core output optical interface. A port of the first multi-core adapter, located in the housing 31, is connected to one end of at least one first single-core fiber connector 36. The other end of each first single-core fiber connector 36 is connected to an input end of each first optical splitter 35 in a one-to-one correspondence by using an optical fiber. A port of the second multi-core adapter, located in the housing 31, is connected to one end of at least one second single-core fiber connector 37. The other end of each second single-core fiber connector 37 is connected to the first output end of each first optical splitter 35 in a one-to-one correspondence by using an optical fiber. A port of each single-core adapter, located in the housing 31, is connected to one end of each third single-core fiber connector 38 in a one-to-one correspondence, and the other end of each third single-core fiber connector 38 is connected to each second output end of the first optical splitter 35 in a one-to-one correspondence.

For example, two single-core fiber connectors 36 are connected to the first multi-core adapter shown in FIG. 5, and the two single-core fiber connectors 36 are further connected to input ends of two optical splitters 35 respectively. Two single-core fiber connectors 37 are connected to the second multi-core adapter, and the two single-core fiber connectors 37 are further connected to first output ends of two optical splitters 35 respectively. One single-core fiber connector 38 is connected to each single-core adapter, and each single-core fiber connector 38 is further connected to second output ends of two optical splitters 35 in a one-to-one correspondence.

It may be understood that a port of the first multi-core adapter, located out of the housing 31, is configured to connect to one end of a first multi-core connector and that the other end of the first multi-core connector is configured to connect to a multi-core output optical interface of a first optical splitting device. A port of the second multi-core adapter, located out of the housing 31, is configured to connect to one end of a second multi-core connector and that the other end of the second multi-core connector is configured to connect to the multi-core input optical interface of the second optical splitting device at the next level. A port of each single-core adapter, located out of the housing 31, is configured to connect to each ONT in a one-to-one correspondence by using a fiber connector. It should be understood that dustproof caps may be disposed on out-of-housing ports of the first multi-core adapter, the second multi-core adapter, and the single-core adapter. When a fiber connector does not need to be mounted, a fiber adapter may be sealed by mounting a dustproof cap.

It should be noted that a quantity of fiber cores supported by the multi-core input optical interface and a quantity of fiber cores supported by the multi-core output optical interface on the second optical splitting device are not limited in this application. In addition, a quantity of optical splitters and a quantity of single-core output optical interfaces in the second optical splitting device are not limited in this application either.

The second optical splitting device provided in this application is described above. For structures of other second optical splitting devices than a second optical splitting device at a last level in a plurality of cascaded second optical splitting devices, refer to the foregoing descriptions. The following describes the second optical splitting device at the last level.

Figure 9:
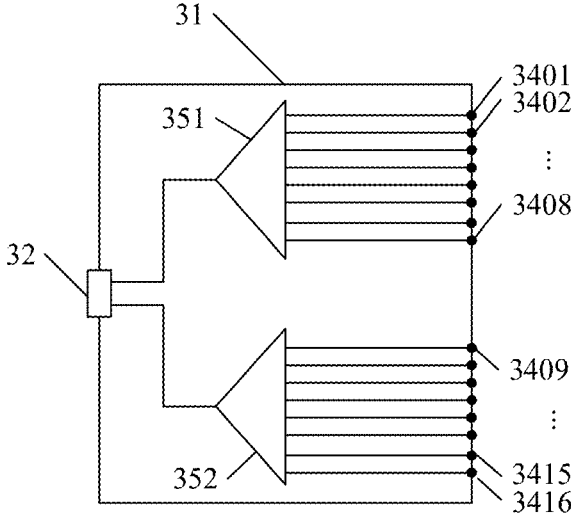
FIG. 9 is a schematic diagram of another embodiment of a second optical splitting device according to this application.

FIG. 9 is a schematic diagram of another embodiment of the second optical splitting device according to this application. It may be understood that the second optical splitting device at the last level is already a last one of the plurality of cascaded second optical splitting devices. Therefore, the second optical splitting device does not include a multi-core output optical interface. Naturally, an output end does not need to be separately allocated in an optical splitter in the second optical splitting device to connect to the multi-core output optical interface. Specifically, each single-core output optical interface (3401 to 3416 shown in FIG. 9) of the second optical splitting device is connected to an output end of the optical splitter 351 and an output end of the optical splitter 352 in a one-to-one correspondence. Structures of other parts are similar to those of the second optical splitting devices shown in FIG. 5 and FIG. 6. Details are not described again herein.

In the embodiments of this application, the multi-core input optical interface of the second optical splitting device supports a plurality of optical fibers, a plurality of optical splitters may be disposed in the second optical splitting device, and each optical fiber may be connected to an input end of a corresponding optical splitter. Although a quantity of output ends of each optical splitter is limited, because a quantity of optical splitters in the second optical splitting device is expanded, the second optical splitting device can be connected to more ONTs. Therefore, in a scenario with relatively high user density, investment costs and construction difficulty are reduced.

It may be understood that names such as the multi-core input optical interface, the multi-core output optical interface, the single-core output optical interface, the output end of the optical splitter, and the output end are all defined based on a transmission direction of a downlink optical signal. During uplink optical signal transmission, the multi-core input optical interface may also be configured to output light, the multi-core output optical interface and the single-core output optical interface may also be configured to input light, the output end of the optical splitter may also be configured to input light, and the input end of the optical splitter may also be configured to input light. Therefore, the multi-core input optical interface, the multi-core output optical interface, the single-core output optical interface, the output end of the optical splitter, and the output end are merely name definitions, and are not intended to limit a function (for example, light input or light output).

The foregoing descriptions are merely example implementation of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An optical splitting device comprising:
   a housing,
   at least one first optical splitter,
   a multi-core input optical interface,
   a multi-core output optical interface, and
   at least one single-core output optical interface,
   wherein the multi-core input optical interface, the multi-core output optical interface, and the at least one single-core output optical interface are disposed on an outer wall of the housing,
   wherein the at least one first optical splitter is disposed in the housing, and each first optical splitter comprises an input end, a first output end, and at least one second output end;
   wherein the multi-core input optical interface is connected to an input end of the at least one first optical splitter, the first output end of each first optical splitter is connected to the multi-core output optical interface, wherein the multi-core output optical interface is connected to a multi-core input optical interface of an another optical splitting device at a next lower level, the second output end of each first optical splitter is connected to the at least one single-core output optical interface in a one-to-one correspondence, wherein the at least one single-core output optical interface is connect to at least one optical network terminal (ONT) in a one-to-one correspondence; and
   wherein the multi-core input optical interface supports a plurality of optical fibers, and each of the plurality of optical fibers is connected to the input end of an optical splitter of the at least one first optical splitter.

2. The optical splitting device according to claim 1, wherein a first multi-core adapter is disposed on the multi-core input optical interface, a second multi-core adapter is disposed on the multi-core output optical interface, and a single-core adapter is disposed on each single-core output optical interface.

3. The optical splitting device according to claim 2, wherein an in-housing port of the first multi-core adapter is connected to one end of at least one first single-core fiber connector, and the other end of the at least one first single-core fiber connector is connected to the input end of the at least one first optical splitter in a one-to-one correspondence by using an optical fiber:
   wherein an in-housing port of the second multi-core adapter is connected to one end of at least one second single-core fiber connector, and the other end of the at least one second single-core fiber connector is connected to the first output end of the at least one first optical splitter in a one-to-one correspondence by using an optical fiber; and wherein an in-housing port of each single-core adapter is connected to one end of each third single-core fiber connector in a one-to-one correspondence, and the other end of each third single-core fiber connector is connected to each second output end of the first optical splitter by using an optical fiber.

4. The optical splitting device according to claim 2, wherein a quantity of fiber cores supported by the first multi-core adapter and a quantity of fiber cores supported by the second multi-core adapter are greater than or equal to a quantity of the first optical splitters.

5. The optical splitting device according to claim 2, wherein an out-of-housing port of the first multi-core adapter is configured to connect to a first multi-core fiber connector, an out-of-housing port of the second multi-core adapter is configured to connect to a second multi-core fiber connector, and an out-of-housing port of each single-core adapter is configured to connect to a fourth single-core fiber connector.

6. The optical splitting device according to claim 2, wherein an optical cable connected to a first multi-core fiber connector and an optical cable connected to a second multi-core fiber connector are distribution cables.

7. The optical splitting device according to claim 1, wherein at least one second optical splitter is further disposed in the housing, the second output end of the at least one optical splitter is connected to an input end of the at least one second optical splitter in a one-to-one correspondence, and an output end of the at least one second optical splitter is connected to the single-core output optical interface in a one-to-one correspondence.

8. The optical splitting device according to claim 1, wherein the at least one first optical splitter is an uneven optical splitter, and output optical power of the first output end is higher than output optical power of the second output end.

9. The optical splitting device according to claim 1, wherein the housing comprises a base and an upper cover, wherein the base and the upper cover are detachably and fixedly connected, and wherein the multi-core input optical interface, the multi-core output optical interface, and the at least one single-core output optical interface are disposed on an end face of the base.

* * * * *